United States Patent
Gilboy

(10) Patent No.: US 8,406,224 B2
(45) Date of Patent: *Mar. 26, 2013

(54) INTERNET TELEPHONY WITH INTERACTIVE INFORMATION

(75) Inventor: Christopher P. Gilboy, Freehold, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 252 days.

This patent is subject to a terminal disclaimer.

(21) Appl. No.: 12/830,639

(22) Filed: Jul. 6, 2010

(65) Prior Publication Data

US 2010/0272099 A1    Oct. 28, 2010

Related U.S. Application Data

(63) Continuation of application No. 10/945,297, filed on Sep. 20, 2004, now Pat. No. 7,782,840, which is a continuation of application No. 09/625,612, filed on Jul. 26, 2000, now Pat. No. 6,829,233.

(51) Int. Cl.
*H04L 12/66* (2006.01)
*H04J 3/12* (2006.01)

(52) U.S. Cl. .......................... 370/352; 370/522

(58) Field of Classification Search ................. None
See application file for complete search history.

(56) References Cited

U.S. PATENT DOCUMENTS

| | | | | | |
|---|---|---|---|---|---|
| 5,889,852 | A | * | 3/1999 | Rosecrans et al. | 379/355.05 |
| 5,970,124 | A | * | 10/1999 | Csaszar et al. | 379/88.18 |
| 5,987,424 | A | * | 11/1999 | Nakamura | 705/14.39 |
| 5,991,394 | A | * | 11/1999 | Dezonno et al. | 379/265.09 |
| 6,084,583 | A | * | 7/2000 | Gerszberg et al. | 715/867 |
| 6,084,628 | A | * | 7/2000 | Sawyer | 725/34 |
| 6,141,010 | A | * | 10/2000 | Hoyle | 715/854 |
| 6,493,437 | B1 | * | 12/2002 | Olshansky | 379/114.13 |
| 6,603,838 | B1 | * | 8/2003 | Brown et al. | 379/88.22 |

* cited by examiner

*Primary Examiner* — Chi Pham
*Assistant Examiner* — Soon-Dong D Hyun

(57) ABSTRACT

A subscriber (12, 14, 16) initiating an Internet telephony call may receive specific content targeted to that subscriber in accordance with a match between at least one of the dialed number and the calling party number. Upon receipt of the subscriber's Internet telephony call, an Internet Telephony Service Provider server (18) searches each of a dialed number database, a calling party number database and a default database to establish a match between the calling party number, the dialed number or a range of either numbers. Upon finding a match, the Internet Telephony Service Provider server retrieves corresponding content, typically in the form of a URL that links to an associated web site, to provide to the subscriber who may elect to retrieve that information at the subscriber's discretion.

20 Claims, 4 Drawing Sheets

PC = PERSONAL COMPUTER
BTI = BROADBAND TELEPHONY INTERFACE
MTA = MEDIA TERMINAL ADAPTOR
DNS = DOMAIN NAME SERVER
ITSP = INTERNET TELEPHONY SERVICE PROVIDER
CPN = CALLING PARTY NUMBER
DN = DIALED NUMBER

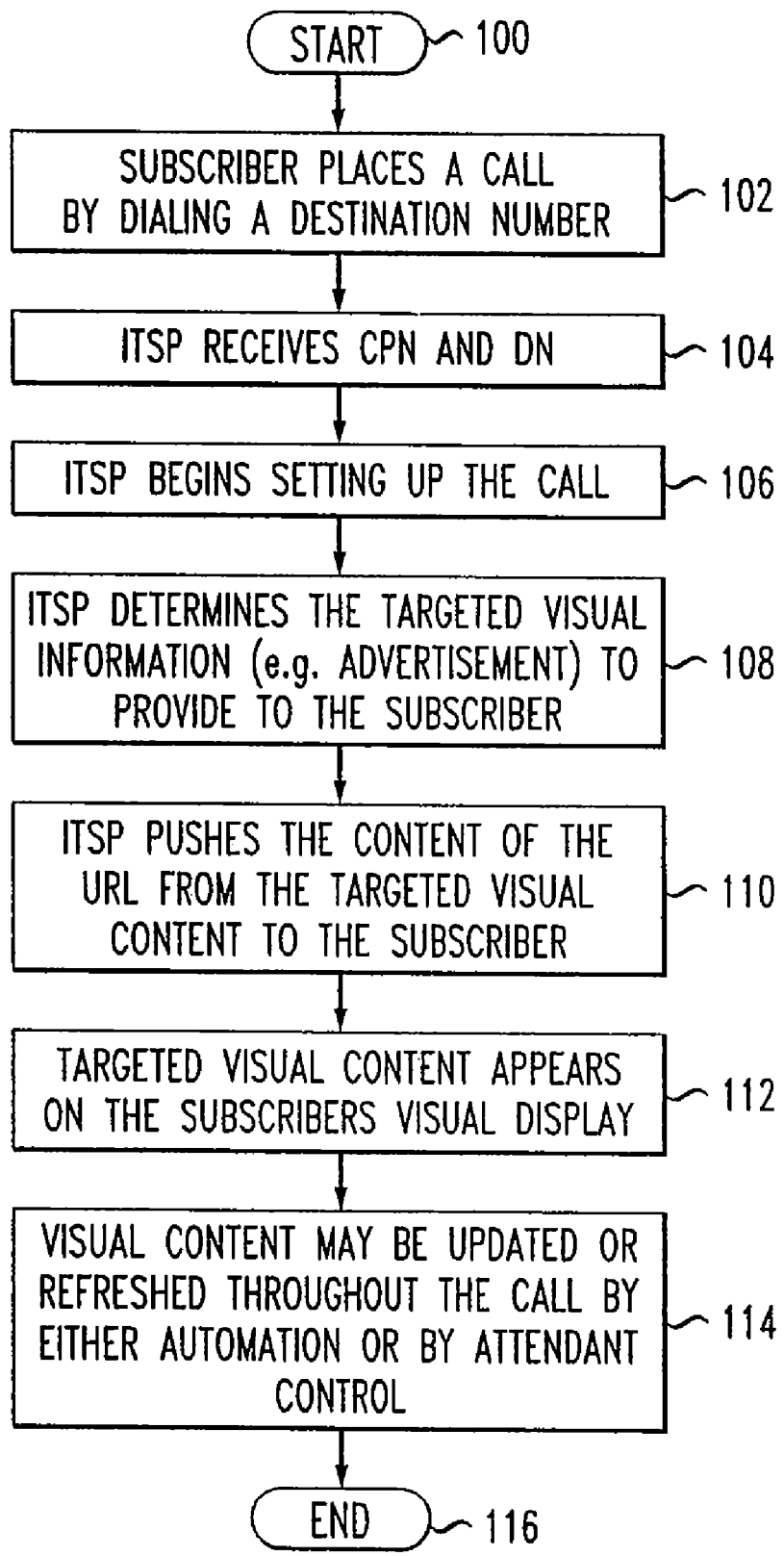

FIG. 3

Table 200:

| CPN (202) | NEXT CONTENT INDEX (208) | CONTENT (204) | PRIORITY (206) |
|---|---|---|---|
| 732-420-0000 | 1 | 1: www.mtv.com/advertise<br>2: www.visa.com/adv#33<br>3: www.hotbot.com/message | .7<br>.3<br>.6 |
| 732-420-9999 | 1 | 1: www.weather.com/freehold-nj | 1.0 |
| 908-221-0000 | 1 | 1: www.thestreet.com/advertise<br>2: www.hilton.com/adv#3463<br>3: www.hotbot.com/message | .7<br>.9<br>.6 |
|  |  |  |  |

FIG. 4

Table 300:

| DN (302) | CONTENT (304) | PRIORITY (306) |
|---|---|---|
| 800-HIL-TON1 | www.hilton.com/bestbuys?customer='CPN' | 1.0 |
| 800-232-0123 | www.dell_service.com/queuestat?customer='CPN' | 1.0 |
| 908-221-0200 | www.att.com/phonebook | 1.0 |
|  |  |  |

FIG. 5

| MATCH | CONTENT | PRIORITY |
|---|---|---|
| DN=303* | www.denver.com/welcome | 0.1 |
| CPN=412* | www.weather.com/loc=PA | 0.1 |
| DN=732*, 201*, 908* | www.news.com/loc=NJ | 0.1 |
| DN=*, CPN=* | www.itsp.com/thankyou?sub=CPN | 0.0 |

INTERNET TELEPHONY WITH INTERACTIVE INFORMATION

The present application is a continuation of prior application Ser. No. 10/945,297 filed Sep. 20, 2004, which is a continuation of prior U.S. application Ser. No. 09/625,612 entitled Internet Telephony with Interactive Information, filed Jul. 26, 2000, and issued as U.S. Pat. No. 6,829,233 issued on Dec. 7, 2004, both of which are incorporated by reference herein.

TECHNICAL FIELD

This invention relates to a technique for providing a caller initiating an Internet-telephony call with additional information during the course of the call.

BACKGROUND ART

The proliferation of large-scale inter-connected computer networks, such as the Internet, as well as advances in the field of speech digitization, has made Internet telephony a reality. Indeed, various telecommunications services providers such as AT&T currently offer Internet telephony service. While present-day Internet telephony service usually does not afford the same quality as traditional plain old telephone service, most service providers that offer Internet telephony do so at a lower cost to the subscriber. For many subscribers, the relatively low cost of Internet telephony service makes it very attractive for many types of calls.

Many subscribers of Internet telephony service initiate telephone calls over the Internet via a personal computer. In connection with making such calls, the provider of the Internet telephony service may provide the Internet telephony subscriber with advertising, in the form of a banner ad or the like, at the choosing of the service provider, but unrelated to the call itself. Indeed, Internet Service Providers (ISP) that provide subscribers with access to the Internet generally often provide their subscribers with advertising chosen by the ISP. Since all subscribers receive the advertising provided by Internet telephony providers and ISPs, the advertising will often reach those who have no interest in the particular good or service being advertised. Consequently, such indiscriminant advertising has limited effectiveness.

There currently exist techniques in voice telephony for providing targeted advertising to a calling party. U.S. Pat. No. 4,850,007, issued on May 18, 1989, in the name of Patrick Marino et al. and assigned to AT&T, discloses a technique for affording reduced rate long distance service to a calling party in exchange for the calling party receiving an advertising message. During the call set-up, the calling party receives an advertising message selected in accordance with one or more factors such as the originating number of the calling party, as determined from Automatic Number Identification (ANI). In this way, the advertising provided to a caller can be restricted.

U.S. Pat. No. 6,084,628, issued on Jul. 4, 2000, in the name of Francois Sawyer, discloses a technique for providing targeted advertising to callers during a video conference call. Upon receipt of a video call in a telecommunications network, an ingress switch receiving the call will query a centralized database to retrieve an advertising message in accordance with the caller's preference. The caller then receives such advertisements in a portion of the caller's video screen. The called party may also receive advertisements. Both the calling and called parties may select among different advertisements for viewing. Once the either party has selected an advertisement, each may select a more detailed advertisement for joint viewing.

While these approaches do afford a calling party the ability obtain selective advertising, such approaches suffer from the disadvantage that they do not allow the called party to make content specifically available to the calling party at the discretion of the called party. Thus, there is need for a method for allowing the called party to make available (i.e., to "push") content to the calling party at the discretion of the called party.

BRIEF SUMMARY OF THE INVENTION

Briefly, in accordance with a preferred embodiment of the invention, a method is provided for enabling a calling party placing an Internet telephony call to selectively receive content information during the course of the call at the discretion of the called party, the calling party, or a combination of both. The method commences upon receipt at an Internet Telephony Service Provider of a calling party number and a dialed number from a calling party initiating an Internet telephone call. Following receipt of the calling party number and dialed number, the Internet telephony provider serves to set-up the Internet telephony call. In the course of setting up the call, the Internet Telephony Service Provider determines what targeted information (e.g., advertising, topical information, regional-specific information, caller authentication, streaming video feed) to provide to the calling party in accordance with a match with at least the dialed number, and more preferably, in accordance with a match between a combination of the dialed number and the called party number. Thereafter, the Internet Telephony Service Provider makes such targeted information available to the calling party, typically in the form of one or more Universal Resource Locators (URLs) which the calling party may access at their discretion. As needed, the Internet Telephony Service Provider may update the content provided to the calling party during the course of the call.

BRIEF DESCRIPTION OF THE DRAWINGS

FIG. 2 is a flow chart illustrating the steps of the method of the invention for providing an Internet telephony caller with targeted information;

FIG. 3 illustrates in tabular form a portion of the contents of a calling party number database comprising part of the network architecture of FIG. 1;

FIG. 4 illustrates in tabular form a portion of the contents of a dialed number database comprising part of the network architecture of FIG. 1; and FIG. 5 illustrates in tabular form a portion of the contents of a default database comprising part of the network architecture of FIG. 1.

DETAILED DESCRIPTION

Figure 1:
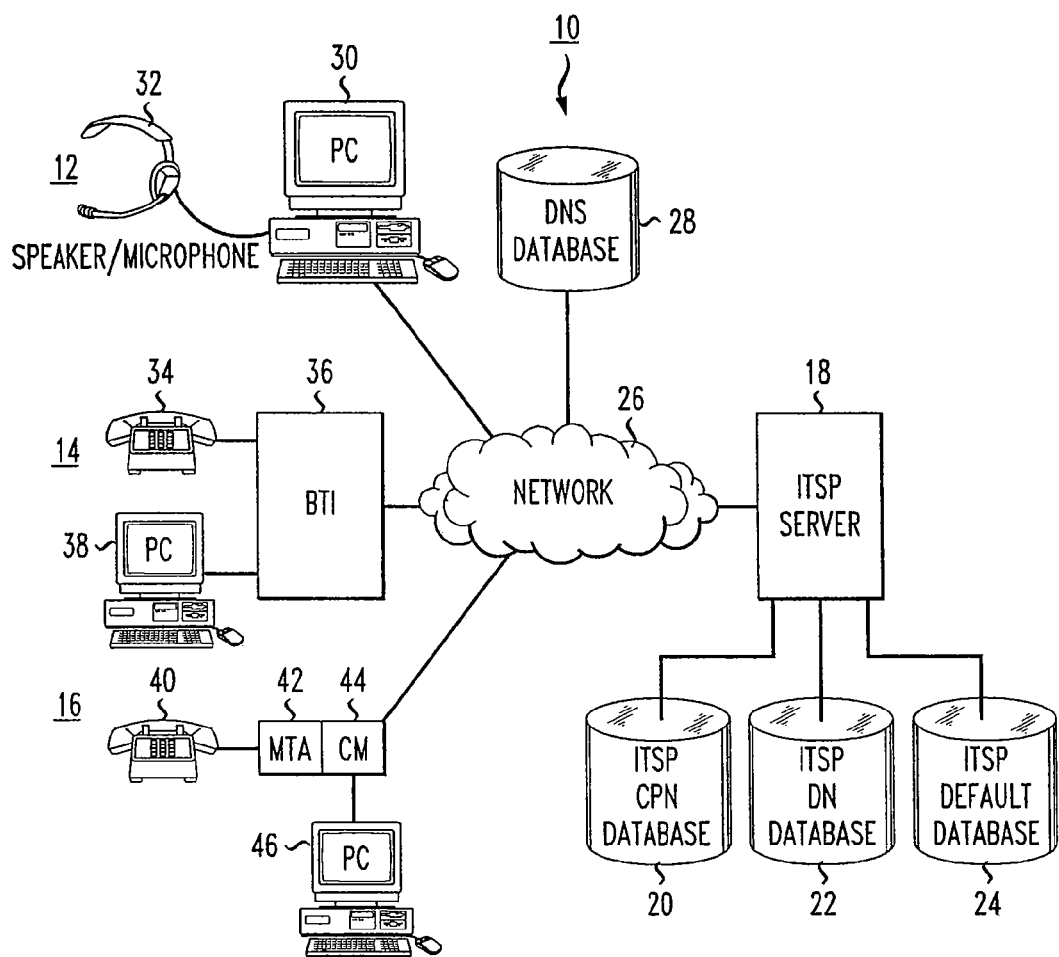
FIG. 1 illustrates a block schematic diagram of a network architecture for providing Internet telephony Service in accordance with the invention.

FIG. 1 illustrates a network architecture 10 for providing Internet telephony service, together with selected content information to one of a plurality of callers 12, 14 and 16 initiating an Internet telephone call. At the heart of the architecture 10 is an Internet Telephony Service Provider (ITSP) server 18 operated by provider of Internet Telephony service such as AT&T. The server 18 enjoys links to an ITSP calling party number (CPN) database 20, an ITSP dialed number (DN) database 22 and a ITSP default database 24, described in greater detail in FIGS. 3, 4 and 5, respectively.

A network 26 connects the ITSP server 18 to each of the subscribers 12, 14 and 16. The network 26 may include the Public Switched Telephone Network (PSTN), a wireless network, a data network, a cable television network or a combination of any or all of them. Associated with the network 26 is a dialed number server (DNS) 28 that provides a mapping between Domain names and IP Addresses as defined in IETF RFC 1034 and 1035.

While not critical to the invention, the subscribers 12, 14, and 16 may access the ITSP server 18 to commence an Internet telephone call in different ways. For example, the subscriber 12 may employ a conventional personal computer 30 with a modem (not shown), together with a speaker/microphone 32. Alternatively, the subscriber 14 may use a telephone set 34 coupled to the network 26 via a broadband telephony interface (BTI) 36. Note that the BTI 36 could also couple a personal computer 38 at the premises of the subscriber 14 to the network 26 as well. The subscriber 16 may access the network 26 from a telephone 40 via the combination of a multimedia terminal adapter 42 and a cable modem 44. The cable modem 44 may also connect a personal computer 46 at the premises of the subscriber 16 to the network 26. The telephone number of the originating caller, hereinafter referred to as the calling party number (CPN) is passed to server 18 by the client software application on 30, 36, and 44. As explained in detail below, the ITSP server 18 makes use of the CPN to determine what information to provide to the calling party in accordance with the invention.

FIG. 2 illustrates a flow chart of the steps executed by the ITSP server 18 of FIG. 1 to provide selected information to one or more of the subscribers 12, 14, and 16 of FIG. 1 in connection with an Internet telephony call in accordance with the invention. The ITSP server 18 enters the method upon execution of step 100 of FIG. 2 and thereafter awaits an Internet telephone call which, one or more of the subscribers 12, 14 and 16 of FIG. 1 typically initiate by dialing a destination (dialed number) during step 102. The dialed number entered by the subscriber initiating the Internet telephony call is received by the ITSP server 18 of FIG. 1 during step 104, along the CPN, as provided by the DNS 28 of FIG. 1.

Upon receipt of the CPN and DN associated with the Internet telephony call initiated by a subscriber, the ITSP server 18 begins setting up the call during step 106 of FIG. 2. In other words, the ITSP server 18 establishes the links needed to complete the call by a calling subscriber. In connection with setting up the call, the ITSP server 18 determines what if any targeted visual information or content, typically, although not necessarily advertising, to provide to the calling party during step 108 of FIG. 2. As discussed in greater detail in connection with FIGS. 3, 4, and 5, the ITSP server 18 determines the targeted information to provide to the calling party in accordance with at a match of at least the DN, and typically, in accordance with a match between both the CPN and DN using the databases 20, 22, and 24 of FIG. 1.

Having determined what information to provide to the calling party during step 108, the ITSP server 18 provides or "pushes" the content to the calling party, typically by providing the URL of the content to the subscriber during step 110. The targeted visual content appears on the calling party's display device during step 112 so that the caller can view that information at his/her discretion. The calling party's display device could include a display monitor (not shown) associated with a personal computer, a television set, an internal LCD or LED read out associated with a telephone, or a peripheral display device, such as a Personal Data Assistant.

During the course of the call, the ITSP server 18 of FIG. 1 may update or refresh the content, either automatically, or by attendant control during step 114 of FIG. 2. As an example of the latter scenario, an attendant associated with the called party may update the targeted information in response to a request made by the calling party for additional information during the course of the call. When the calling party terminates the call, the process ends (step 116).

The ITSP server 18 determines what targeted information to provide to the calling party by searching the CPN, DN and Default databases 20, 22 and 24, respectively. Although three separate databases 20, 22 and 24 are illustrated in FIG. 1, a single database could contain the information. As depicted in FIG. 3, the CPN database 20 comprises a table 200 listing a plurality of CPN blocks 202, each block containing the telephone number of a subscriber that subscribes to Internet telephony service from the ITSP server 18 of FIG. 1. Associated with each of the CPN blocks 202 is a corresponding one of content blocks 204. Each content block 204 associated with a corresponding CPN block 202 includes one or more URLs that each provide a link to content targeted information (e.g., advertising) for access by the subscriber associated with the particular CPN. Thus, for example, the CPN 732-420-0000 has three separate URLs associated with this number, namely www.mtv.com/advertise, www.vias.com/adv/#33, and www.hotbot.com/message.

There are various mechanisms for selecting the particular URLs associated with each CPN. For example, each subscriber could identify his/her favorite URLs to the Internet Telephony Service Provider that maintains the ITSP 18. To the extent that a caller has identified to a web site a willingness to have the caller's telephone number linked to that site, then the web site could provide the ITSP server 18 with such information.

Each content block 204 is associated with a corresponding one of priority blocks 206. Each priority block 206 has a priority value corresponding to the URLs within the associated content block. Thus for example, the URLs www.mtv.com/advertise, www.vias.com/adv/#33, and www.hotbot.com/message within a first content block 204 have priorities 0.7, 0.3 and 0.6, respectively, as specified by the corresponding priority block 206. The priority associated with each URL defines the priority by which the ITSP server 18 of FIG. 1 selects the URL to "push" to the particular CPN. Thus, the URL having the higher priority is selected before a URL having a lower priority. Note that some CPNs may only have a single associated URL in which case, the priority associated with that URL is 1.

Each content block 204 has a corresponding one of next content indexes 208 associated therewith. Each next content index 208 comprises a pointer that points to a particular URL within the corresponding content block. In some instances, a calling party may prefer to have the ITSP server 18 of FIG. 1 loop through the URLs. The next content index tracks which of the URLs is currently identified to facilitate such looping.

FIG. 4 depicts a tabular view of the CPN database 22 of FIG. 1. Like the CPN database 20 of FIG. 3, the DN database 22 is depicted in FIG. 4. as a table 300 that includes a plurality of DN blocks 302, each DN block containing the number of a called party that wishes to provide selectable content to a calling party in accordance with the invention. Thus, for example, the first of the DN blocks 302 contains the telephone number 800-HILTON1, associated with the Hilton Hotel Chain.

In practice, the ITSP server 18 will populate each of the DN blocks 302 with the DN of each entity that wishes to provide content to Internet telephony callers. The Internet Telephony Service Provider could charge a fee for this service in several different ways. For example, the Internet Telephony Service Provider could charge a flat monthly rate, or a graduated rate based on the number of URLs listed for each DN. In place of, or in addition to a monthly fee, the Internet Telephony Service Provider could charge a certain fee each time the ITSP server 18 provides content to a called party.

Associated with each of the DN blocks 302 is a corresponding one of content blocks 304, each content block containing at least one URL that directs the calling party to content associated with the called party. Thus, for example, the content block 304 associated with the DN block containing the dialed number 800-HILTON1 may contain the URL www.hilton.com/bestbuys?customer='CPN', where 'CPN' represents the actual subscriber's CPN (this allows the content to be tailed to the individual subscriber). Each content block 304 has an associated priority block 306 that contains the priority related with the content contained in that content block. Thus, for example, the content block 304 containing the URL www.hilton.com/bestbuys?customer='CPN' has a priority of 1.0. Other content blocks may have the same or different priorities. The priority associated with each URL in a particular content block 304 determines in what priority the ITSP server 18 provides the URL to the calling party.

FIG. 5 depicts a tabular view of the default database 24 of FIG. 1. As described below, the default database 24 allows the ITSP server 18 of FIG. 1 to select targeted information that matches a range of DNs or CPNs using wildcards (e.g.*). The default database of FIG. 5 appears as a table 400 that includes a plurality of match blocks 402. Each match block 402 contains a particular matching criterion. For example, the first match block 402 contains the matching criterion "DN=303*". When ITSP 18 of FIG. 1 receives a dialed number that includes the area code 303, then there is a match with the contents of the first match block 402. The other match blocks 402 contain different matching criterion. Associated with each match blocks 402 is a corresponding one of content blocks 404. Each content block 404 contains at least one URL that the ITSP server 18 of FIG. 1 provides to the calling party whose criteria (i.e., DN and/or CPN) matches the contents of the corresponding match block. Thus, for example, for an Internet telephony call whose dialed number contains the area code "303", the associated content block will contain content associated with that area code, such as the URL www.denver.com/welcome. Each content block 404 has an associated priority block 406 that contains the priority linked with the content in that content block. Thus, for example, the content block 404 containing the URL www.denver.com/welcome has a priority of 0.1. Other content blocks may have the same of different priorities. The priority in each priority block 404 determines in what priority the ITSP server 18 of FIG. 1 makes the content (i.e., the URL) available.

In operation, when the ITSP server 18 of FIG. 1 receives the CPN and DN in connection with an Internet telephony call, the server searches each of the CPN, DN and default databases 20, 22 and 24, respectively. Upon finding a match in any of the databases, the ITSP server 18 will then provide (push) the corresponding content to the calling party. This content may be directly provided to the calling or the calling party may be given the option to chose to receive the content (by "clicking" on the URL) at his/her discretion. In case a possible conflict arises between the matches returned by the databases, the ITSP server 18 will provide the content having the highest priority.

The foregoing describes a technique for providing an Internet Telephony caller with interactive content.

The above-described embodiments merely illustrate the principles of the invention. Those skilled in the art may make various modifications and changes that will embody the principles of the invention and fall within the spirit and scope thereof.

What is claimed is:

1. A method for providing a caller initiating an internet telephony call with interactive information, the method comprising:
   receiving, at an internet telephony service provider server, a calling party number and a dialed number from a subscriber initiating an internet telephony call;
   matching, at the internet telephony service provider server, the dialed number and the calling party number to information related to the dialed number and the calling party number; and
   transmitting, from the internet telephony service provider server, the information to the calling party at the discretion of the called party.

2. The method of claim 1 wherein the information transmitted to the calling party comprises a universal resource locator that identifies a web site containing related information.

3. The method of claim 2 wherein the information transmitted to the calling party comprises multiple universal resource locators, each of the multiple universal resource locators identifying a web site containing related information.

4. The method of claim 3 wherein each of the multiple universal resource locators has a priority value that determines an order in which each of the multiple universal resource locators will be transmitted.

5. The method of claim 2 wherein universal resource locator content is customized based on the calling party number.

6. The method of claim 2 wherein universal resource locator content is customized based on the dialed number.

7. The method of claim 1 further comprising:
   transmitting updated information to the calling party during the call.

8. The method of claim 7 wherein the updated information comprises a universal resource locator that identifies a web site containing related information.

9. The method of claim 7 wherein the updated information comprises multiple universal resource locators, each of the multiple universal resource locators identifying a web site containing related information.

10. The method of claim 9 wherein each of the multiple universal resource locators has a priority value that determines an order in which each of the multiple resource locators will be transmitted.

11. The method of claim 8 wherein web site content is customized based on the calling party number.

12. The method of claim 8 wherein web site content is customized based on the dialed number.

13. An internet telephony service provider server configured to:
   receive a calling party number and a dialed number from a subscriber initiating an internet telephony call;
   match the dialed number and the calling party number to information related to the dialed number and the calling party number; and
   transmit the information to the calling party at the discretion of the called party.

14. The internet telephony service provider server of claim 13 wherein the information transmitted to the calling party comprises a universal resource locator that identifies a web site containing related information.

15. The internet telephony service provider server of claim 14 wherein the information transmitted to the calling party comprises multiple universal resource locators, each of the multiple universal resource locators identifying a web site containing related information.

16. The internet telephony service provider server of claim 15 wherein each of the multiple universal resource locators has a priority value that determines an order in which each of the multiple universal resource locators will be transmitted.

17. The internet telephony service provider server of claim 14 wherein universal resource locator content is customized based on the calling party number.

18. The internet telephony service provider server of claim 14 wherein universal resource locator content is customized based on the dialed number.

19. The internet telephony service provider server of claim 13 further configured to:
 transmit updated information to the calling party during the call.

20. An apparatus configured to:
 receive a first party number and a second party number from a user initiating an internet telephony call;
 match the second party number and the first party number to information related to the second party number and the first party number; and
 transmit the information to the first party at the discretion of the second party.

* * * * *